United States Patent
Goering

(10) Patent No.: US 9,763,387 B2
(45) Date of Patent: Sep. 19, 2017

(54) DOFFER FOR A COTTON CLEANER

(71) Applicant: Deere & Company, Moline, IL (US)

(72) Inventor: Kevin J. Goering, Cambridge, IA (US)

(73) Assignee: DEERE & COMPANY, Moline, IL (US)

( * ) Notice: Subject to any disclaimer, the term of this patent is extended or adjusted under 35 U.S.C. 154(b) by 107 days.

(21) Appl. No.: 14/824,604

(22) Filed: Aug. 12, 2015

(65) Prior Publication Data
US 2017/0042091 A1 Feb. 16, 2017

(51) Int. Cl.
*A01D 46/12* (2006.01)
*A01D 46/08* (2006.01)

(52) U.S. Cl.
CPC .................................. *A01D 46/08* (2013.01)

(58) Field of Classification Search
CPC .......... D01B 1/02; D01B 1/04; A46B 13/005; A46B 3/08; A01D 46/08; A01D 46/12
See application file for complete search history.

(56) References Cited

U.S. PATENT DOCUMENTS

| | | | | |
|---|---|---|---|---|
| 2,673,440 A * | 3/1954 | Sawyer | A01D 46/12 | 15/183 |
| 2,827,667 A * | 3/1958 | Moss | D01G 9/06 | 19/202 |
| 2,952,881 A * | 9/1960 | Moss | D01G 9/06 | 19/203 |
| 3,225,389 A * | 12/1965 | Jones | A46B 3/14 | 15/183 |
| 3,241,172 A * | 3/1966 | Tilgner | A46B 13/005 | 15/182 |
| 3,247,552 A * | 4/1966 | Bryant | D01G 99/005 | 19/39 |
| 3,323,175 A * | 6/1967 | Shelburne | D01B 1/08 | 19/203 |
| 3,959,851 A * | 6/1976 | Bledsoe | D01B 1/08 | 19/48 A |
| 4,214,346 A * | 7/1980 | McDonald | D01B 1/08 | 15/183 |
| 4,313,296 A * | 2/1982 | Mitchell, Jr. | A01D 46/12 | 56/130 |
| 4,433,454 A * | 2/1984 | Salmon | D01B 1/08 | 19/55 R |
| 4,723,342 A * | 2/1988 | Strother | D01B 1/08 | 19/40 |

(Continued)

FOREIGN PATENT DOCUMENTS

SU 778725 B * 11/1980 ............. A01D 46/08

*Primary Examiner* — Árpád Fábián-Kovács

(57) ABSTRACT

A cotton doffer structure for doffing cotton snagged on a surface having debris. The cotton doffer structure comprises an extrusion. The extrusion has a longitudinal axis and a periphery with a plurality of radial protrusions. A shaft is coupled to the extrusion for rotation therewith about the longitudinal axis in a forward direction. A plurality of brushes are provided. Each brush has a base end supporting upstanding bristles, an opposing distal end, a leading side generally facing the forward direction, and an opposing trailing side. A plurality of brush support members are provided that have a leading end and a trailing end with an upright flange. The plurality of brush support members securing the base ends of the plurality of brushes against the protrusion with the upright flange located adjacent the leading side.

22 Claims, 4 Drawing Sheets

(56) References Cited

U.S. PATENT DOCUMENTS

| | | | | |
|---|---|---|---|---|
| 5,251,355 A | * | 10/1993 | Drumm | A46B 13/005 15/182 |
| 5,490,301 A | * | 2/1996 | Droeser | A46B 13/005 15/183 |
| 5,819,357 A | * | 10/1998 | Gould | A46B 13/005 15/179 |
| 5,933,907 A | * | 8/1999 | Drumm | A46B 3/08 15/179 |
| 6,421,991 B1 | | 7/2002 | Goering et al. | |
| 6,546,709 B2 | | 4/2003 | Goering et al. | |
| 2002/0069632 A1 | * | 6/2002 | Goering | A01D 46/08 56/28 |
| 2010/0058559 A1 | * | 3/2010 | Cory | D01B 1/08 19/62 A |

* cited by examiner

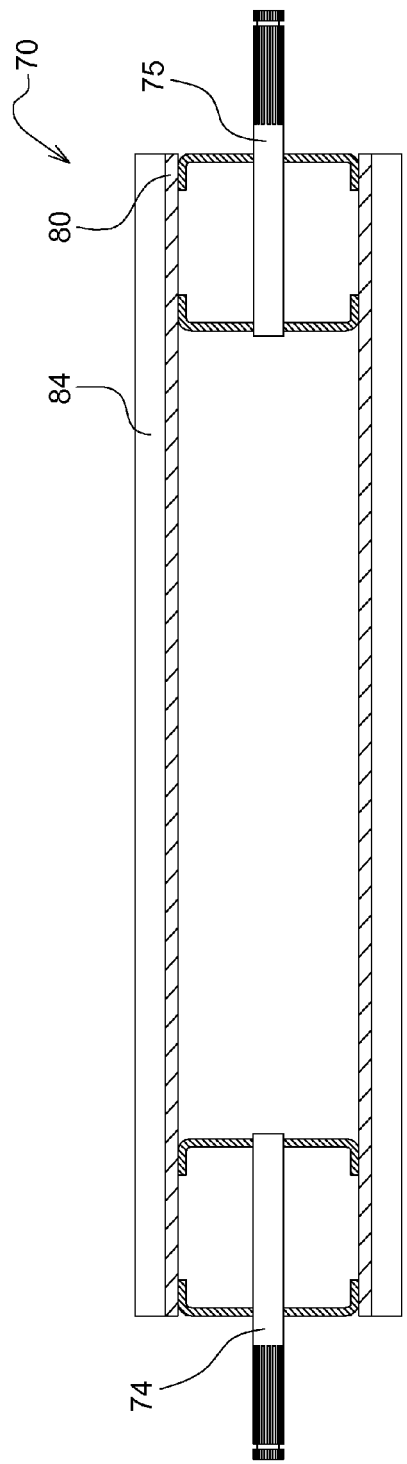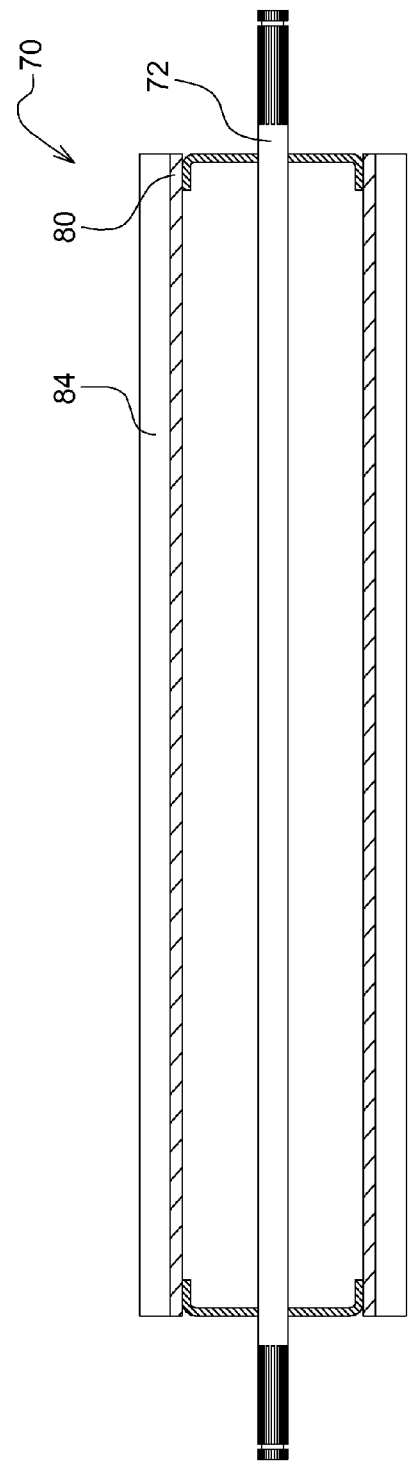

DOFFER FOR A COTTON CLEANER

FIELD OF THE DISCLOSURE

The present disclosure generally relates to cotton cleaners of a cotton harvester, and more particularly to a doffer of a cotton cleaner.

BACKGROUND OF THE DISCLOSURE

Some cotton harvesters, such as the type shown in U.S. Pat. No. 4,606,177 assigned to Deere & Company, include a cotton cleaner for separating seed cotton from trash. The cleaner includes primary and reclaimer saw drums, each having numerous saw tooth discs incrementally spaced along a transverse driven shaft. Seed cotton and trash enter the cleaner and are propelled through a narrow longitudinal opening defined by the outer diameter of the drum, two end walls of the cleaner housing, and a lay-down bar. The lay-down bar presses the cotton upon the rotating saw teeth of the primary drum. As the primary drum rotates at high speed, the saw teeth snag the uncleaned cotton and force it through the narrow opening. The snagged cotton is impelled against several radially spaced bars to further enhance the separation of the trash from the seed cotton. The reclaimer drum snags cotton that gets by the primary drum. A doffer with brushes is rotated at a speed greater than the speed of the primary and reclaimer drums against the tooth discs to dislodge the snagged cotton and propel it towards a conveying duct.

SUMMARY OF THE DISCLOSURE

In one embodiment, a cotton doffer structure for doffing cotton snagged on a surface having debris is disclosed. The cotton doffer structure comprises an extrusion. The extrusion has a longitudinal axis and a periphery with a plurality of radial protrusions. A shaft is coupled to the extrusion for rotation therewith about the longitudinal axis in a forward direction. A plurality of brushes are provided. Each brush has a base end supporting upstanding bristles, an opposing distal end, a leading side generally facing the forward direction, and an opposing trailing side. A plurality of brush support members are provided that have a leading end and a trailing end with an upright flange. The plurality of brush support members secure the base ends of the plurality of brushes against the protrusion with the upright flange located adjacent the leading side.

In another embodiment, a cotton doffer structure for doffing cotton snagged on a surface having debris is disclosed. The cotton doffer structure comprises an extrusion. The extrusion has a longitudinal axis and a periphery with a plurality of radial protrusions forming a plurality of dovetail-shaped recesses. A shaft is coupled to the extrusion for rotation therewith about the longitudinal axis in a forward direction. A plurality of brushes are provided. Each brush has a dovetail-shaped base end supporting upstanding bristles that is received by the dovetail-shaped recesses, an opposing distal end, a leading side generally facing the forward direction, and an opposing trailing side. A plurality of brush support members have a leading end and a trailing end with an upright flange located adjacent the leading side.

In yet another embodiment, a method for doffing cotton snagged on a surface having debris is disclosed. The method comprises rotating a shaft in a forward direction. The shaft is coupled to an extrusion having a longitudinal axis and a periphery with a plurality of radial protrusions. A plurality of brushes are provided. Each brush has a base end supporting upstanding bristles, an opposing distal end, a leading side generally facing the forward direction, and an opposing trailing side. The base ends of the plurality of brushes are secured with a plurality of brush support members having a leading end and a trailing end with an upright flange. The plurality of brush support members secure the base ends of the plurality of brushes against the protrusion with the upright flange located adjacent the leading side.

Other features and aspects will become apparent by consideration of the detailed description and accompanying drawings.

BRIEF DESCRIPTION OF THE DRAWINGS

FIG. 2 is a partial side view of the cotton doffer structure of FIG. 1 according to one embodiment.

FIG. 3 is a partial side view of the cotton doffer structure of FIG. 1 according to another embodiment.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
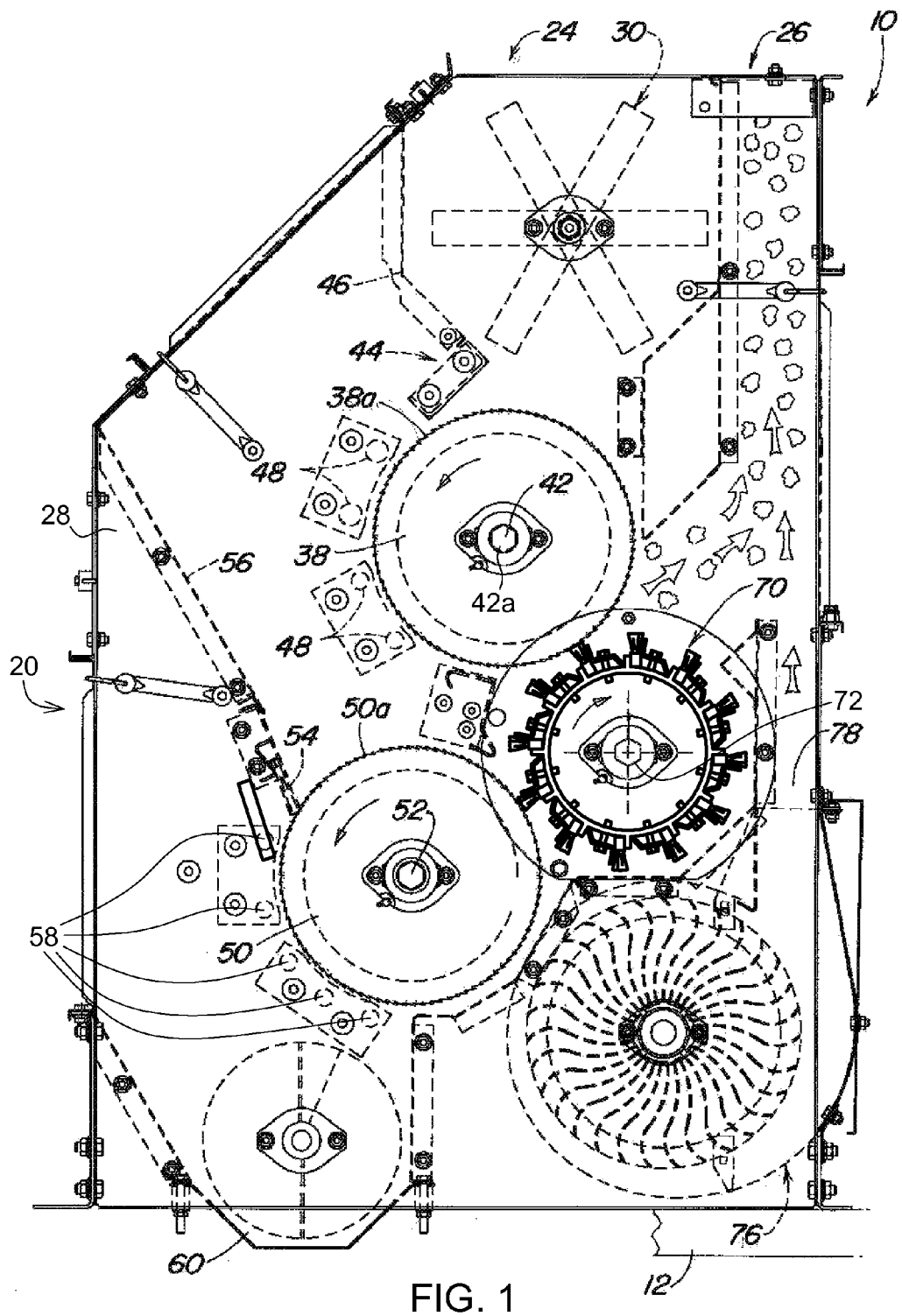
FIG. 1 is a left-hand side elevation view of a cotton cleaner partially broken away.

FIG. 1 illustrates a cotton cleaner 10 supported on a frame 12 of a cotton harvester such as a cotton stripper (not shown) which is generally of the type shown and described in the aforementioned U.S. Pat. No. 4,606,177. With the exception of doffer structure described in detail below, the cleaner 10 is also generally of the same type of construction as that shown and described in the patent. The cleaner 10 includes an upright housing 20 having an inlet portion 24 opening downwardly into the top of the cleaner 10, an outlet duct 26 leading upwardly to the structure for directing cleaned cotton into an accumulator and then to a baler or basket (not shown) on the frame 12, and sidewalls 28. The inlet portion 24 distributes material uniformly across the width of the cleaner 10 onto a feeder shaft 30 extending between sidewalls 28 of the cleaner. A primary saw cylinder or drum 38 is supported for rotation about an axis 42a below and parallel to the feeder shaft 30 by a shaft 42 extending between the cleaner sidewalls 28. A lay-down bar assembly 44 is supported adjacent a lower edge of a panel 46 between the sidewalls 28. The lay-down bar assembly 44 is located adjacent the forward upper quadrant of a toothed periphery 38a of the primary saw cylinder 38 and urges harvested material against the toothed periphery 38a. Grid bars 48 are offset radially from the drum 38 below the assembly 44. As the primary saw cylinder 38 is rotated at a high speed, cotton is snagged by the toothed periphery 38a and is forced through the narrow opening defined between the assembly 44 and the toothed periphery 38a. The snagged cotton is impelled against the bars 48 to separate the trash from the cotton.

A reclaimer saw cylinder or drum 50 similar in structure and operation to the primary saw cylinder 38 is supported for rotation by a shaft 52 parallel to the shaft 42. The reclaimer saw cylinder 50 is located below and slightly forwardly of the primary saw cylinder 38. A brush assembly 54 is supported adjacent the upper forward quadrant of the reclaimer saw cylinder 50 at the lower edge of a sloped panel 56 and brushes cotton lint against a toothed periphery 50a. Grid bars 58 similar to the grid bars 48 are supported adjacent the periphery 50a to separate trash from cotton lint. The separated trash and foreign objects fall to an auger assembly 60 which conveys the separated material out of the cleaner 10.

The cotton lint snagged on the toothed peripheries 38a and 50a of the primary and reclaimer saw cylinders 38, 50 is intercepted by a cotton doffer structure 70 coupled to a shaft 72 (FIG. 3) for rotation between the sidewalls 28 generally behind and between the primary and reclaimer saw cylinders 38, 50. Alternatively, the cotton doffer structure 70 may be coupled to a first stub shaft 74 and a second stub shaft 75 (FIG. 2). The cotton doffer structure 70 doffs the cotton from the primary and reclaimer saw cylinders 38, 50 and directs it into an upwardly directed airstream from a fan 76 and fan outlet duct 78. The cleaned cotton is directed through the outlet duct 26 back towards the accumulator. Further details of the cotton cleaner 10 and cotton conveying system may be had by reference to the aforementioned U.S. Pat. No. 4,606,177.

Figure 4:
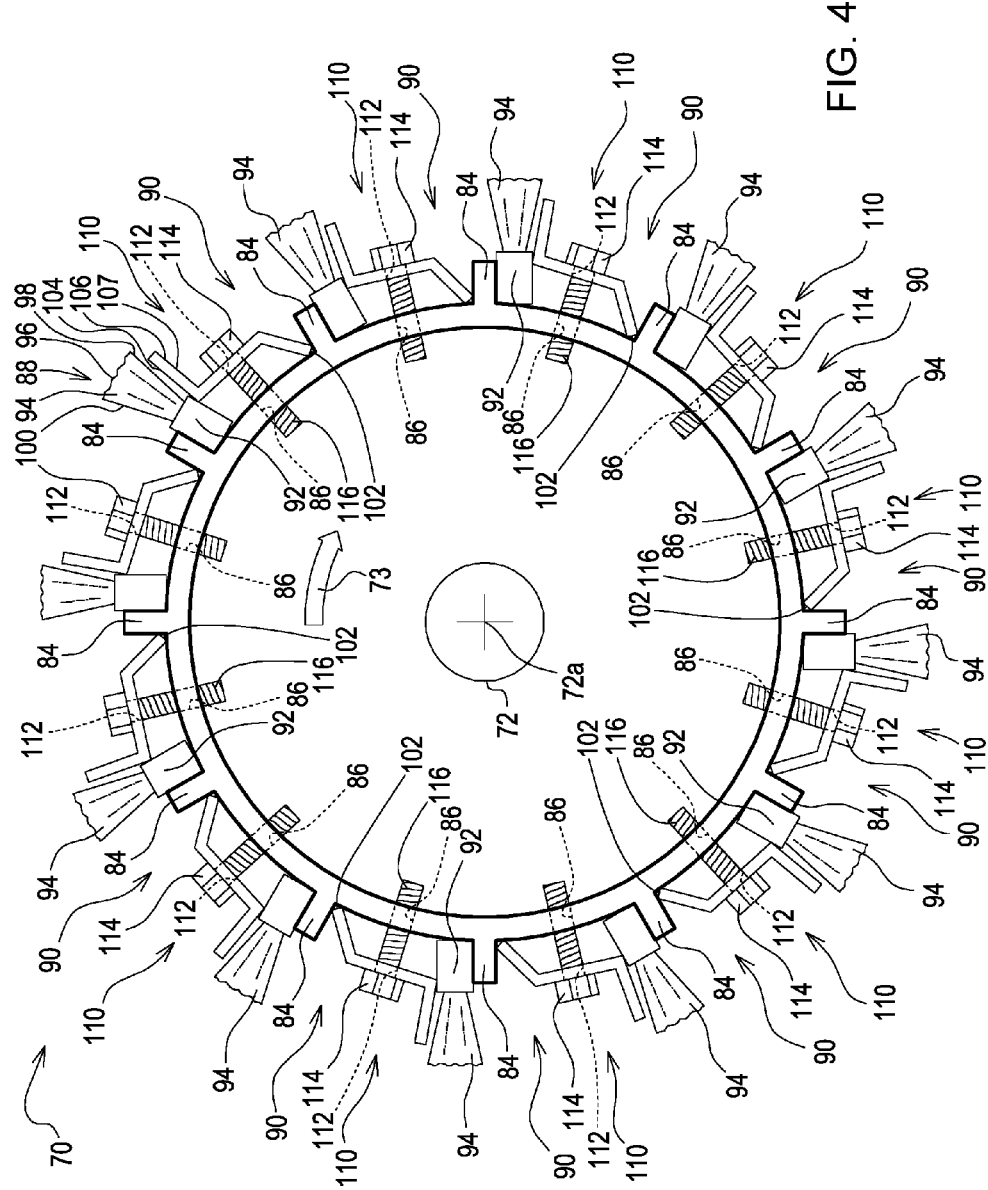
FIG. 4 is a zoomed in view of an end portion of the cotton doffer structure of FIG. 1 according to one embodiment.

With reference to FIG. 4, the cotton doffer structure 70 includes an extrusion 80 having a longitudinal axis 72a and a periphery 82 with a plurality of radial protrusions 84. A plurality of extrusion apertures 86 may be positioned between the plurality of radial protrusions 84. The shaft 72 is coupled to the extrusion 80 for rotation therewith about the longitudinal axis 72a in a forward direction 73.

A plurality of brushes 88 are coupled to the extrusion 80 with a plurality of brush support members 90. Each brush 88 includes a base end 92 that supports upstanding bristles 94. Each brush 88 has a distal end 96 opposite the base end 92. Each brush 88 also has a leading side 98, generally facing the forward direction 73, and an opposing trailing side 100.

The plurality of brush support members 90 each have a leading end 102 and a trailing end 104 with an upright flange 106. The plurality of brush support members 90 are provided to secure the base ends 92 of the plurality of brushes 88 against the protrusion 84 with the upright flange 106 located adjacent the leading side 98. An upper boundary 107 of the upright flange 106 projects above the base ends 92 forwardly of the bristles 94 thereby protecting the bristles 94 from damage when debris is encountered by the cotton doffer structure 70. The upright flange 106 also acts to dislodge debris from the plurality of brushes 88.

A plurality of fasteners 110 may be positioned through a brush support member aperture 112 of the brush support member 90 and the extrusion aperture 86 to secure the brush support members 90 to the extrusion 80. The plurality of fasteners 110 may be bolts 114 having threads 116 that protrude away from the periphery 82 preventing debris from accumulating on the fasteners 110.

Figure 5:
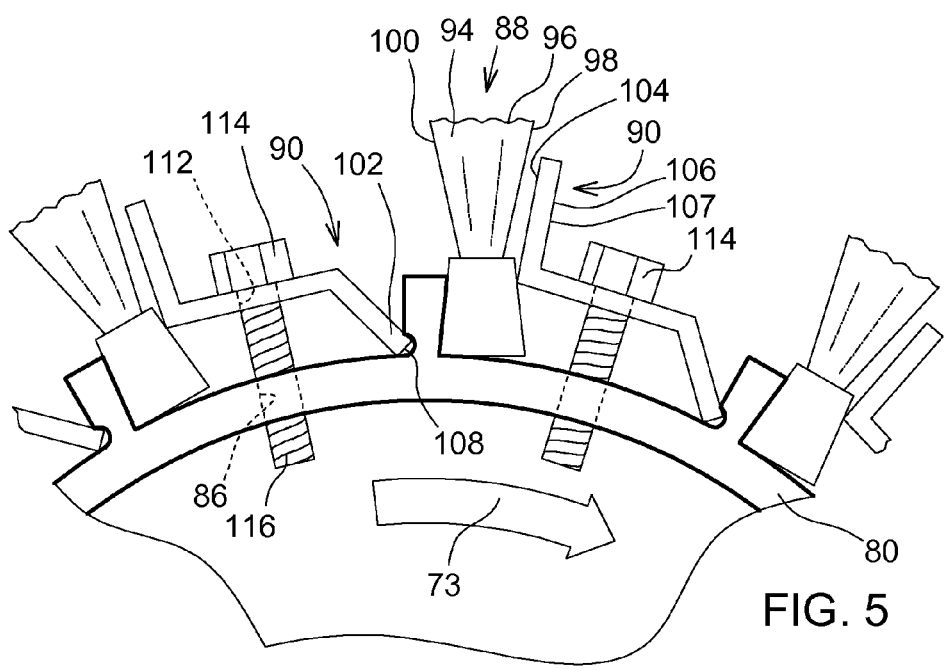
FIG. 5 is a zoomed in view of an end portion of the cotton doffer structure of FIG. 1 according to another embodiment.

Referring to FIG. 5, in one embodiment, the plurality of radial protrusions 84 may include a plurality of protrusion recesses 108 for receiving the leading end 102 of the plurality of brush support members 90. The plurality of protrusion recesses 108 help to secure the plurality of brush support members 90 that retain the plurality of brushes 88.

Figure 6:
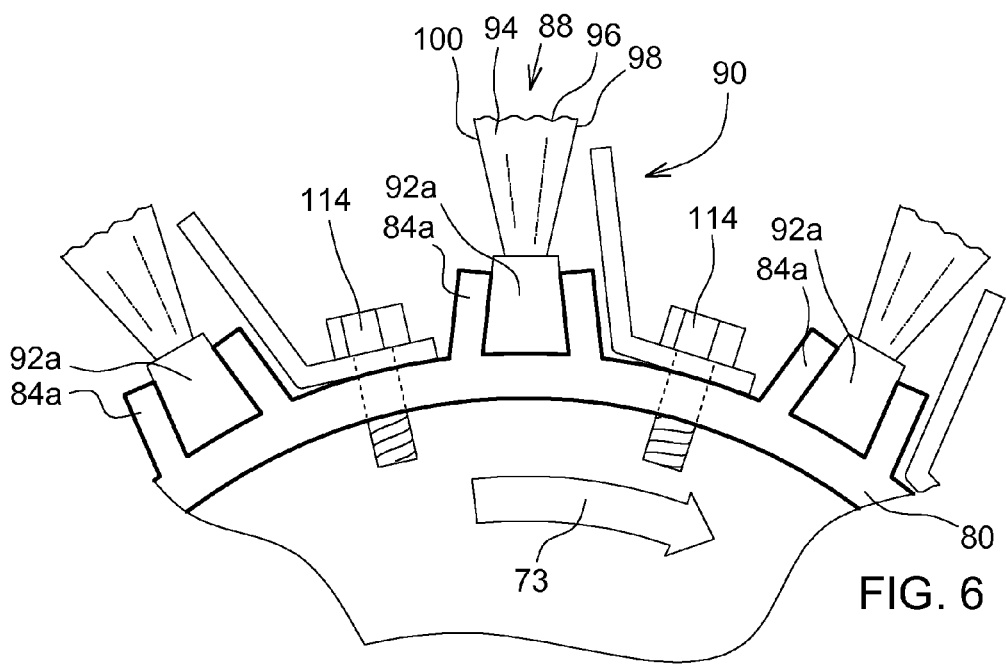
FIG. 6 is a zoomed in view of an end portion of the cotton doffer structure of FIG. 1 according to yet another embodiment.

With reference to FIG. 6, in another embodiment the radial protrusion 84a is dovetail shaped and receives the base end 92a that is opposingly dovetail shaped. The opposing dovetail shapes help to secure the base ends 92a to the extrusion 80.

In operation, the cotton doffer structure 70 has no exposed bolt threads to catch and carry plant residue which helps with trash separation and ease of service.

Various features are set forth in the following claims.

What is claimed is:

1. A cotton doffer structure for doffing cotton snagged on a surface having debris, the cotton doffer structure comprising:
   a single-piece extrusion comprising a rim and a plurality of radial protrusions, the rim having a longitudinal axis and a periphery with the plurality of radial protrusions integrally extending outward from the periphery;
   a shaft coupled to the extrusion for rotation therewith about the longitudinal axis in a forward direction, the rim surrounding the shaft;
   a plurality of brushes, each brush having a base end supporting upstanding bristles, an opposing distal end, a leading side generally facing the forward direction, and an opposing trailing side; and
   a plurality of brush support members, each of the brush support members having a leading end and a trailing end with an upright flange, each of the plurality of brush support members securing a respective one of the base ends of the plurality of brushes against a respective one of the plurality of radial protrusions with the upright flange located adjacent the leading side.

2. The cotton doffer structure of claim 1, further comprising a plurality of extrusion apertures positioned between the plurality of radial protrusions and a plurality of fasteners positioned through a brush support member aperture of the brush support member and the extrusion aperture to secure the plurality of brush support members to the extrusion.

3. The cotton doffer structure of claim 2, wherein each of the fasteners is a bolt having threads that protrude away from the periphery preventing debris from accumulating on the fastener, the bolt further comprises a head, and each of the brush support members is sandwiched by one of the head and the periphery of the rim.

4. The cotton doffer structure of claim 1, wherein the plurality of brush support members have an upper boundary projecting above the base end forwardly of the bristles, thereby protecting the bristles from damage when debris is encountered by the cotton doffer structure, the upright flange also acting to dislodge the debris from the surface.

5. The cotton doffer structure of claim 1, wherein the radial protrusion is dovetail shaped and receives the base end that is opposingly dovetail shaped.

6. The cotton doffer structure of claim 1, wherein the leading end of the plurality of brush support members is positioned against the radial protrusion adjacent the radial protrusion contacted by the brush.

7. The cotton doffer structure of claim 1, wherein the shaft is a first stub shaft coupled to the extrusion and a second stub shaft is coupled to the extrusion.

8. The cotton doffer structure of claim 1, wherein the radial protrusion is dovetail shaped, for partially receiving the base end that is opposingly dovetail shaped, and has a recess formed adjacent to the periphery of the rim for receiving the leading end of the adjacent brush support member.

9. The cotton doffer structure of claim 1, wherein each of the plurality of the radial protrusions comprises a contact surface facing the forward direction, the opposing trailing side of each of the base ends of the brush contacting the contact surface of each of the radial protrusions and a bottom of each of the base ends contacting the periphery of the rim.

10. A cotton doffer structure for doffing cotton snagged on a surface having debris, the cotton doffer structure comprising:
- a single-piece extrusion comprising a rim and a plurality of radial protrusions, the rim having a longitudinal axis and a periphery with a plurality of radial protrusions extending outward from the periphery forming a plurality of dovetail-shaped recesses;
- a shaft coupled to the extrusion for rotation therewith about the longitudinal axis in a forward direction, the rim surrounding the shaft;
- a plurality of brushes, each brush having a dovetail-shaped base end supporting upstanding bristles and respectively received by one of the dovetail-shaped recesses, an opposing distal end, a leading side generally facing the forward direction, and an opposing trailing side; and
- a plurality of brush support members, each of the brush support members having a leading end and a trailing end with an upright flange located adjacent the leading side.

11. The cotton doffer structure of claim 10, further comprising a plurality of extrusion apertures positioned between the plurality of radial protrusions and a plurality of fasteners positioned through a brush support member aperture of the brush support member and the extrusion aperture to secure the plurality of brush support members to the extrusion.

12. The cotton doffer structure of claim 11, wherein each of the fasteners is a bolt having threads that protrude away from the periphery preventing debris from accumulating on the fastener, the bolt further comprises a head, and each of the brush support members is sandwiched by one of the head and the periphery of the rim.

13. The cotton doffer structure of claim 10, wherein the plurality of brush support members have an upper boundary projecting above the base end forwardly of the bristles, thereby protecting the bristles from damage when debris is encountered by the cotton doffer structure, the upright flange also acting to dislodge the debris from the surface.

14. The cotton doffer structure of claim 10, wherein the shaft is a first stub shaft coupled to the extrusion and a second stub shaft is coupled to the extrusion.

15. The cotton doffer structure of claim 10, wherein every two of the radial protrusions cooperate with the periphery of the rim to form a respective one of the plurality of dovetail-shaped recesses.

16. A method for doffing cotton snagged on a surface having debris, the method comprising:
- rotating a shaft in a forward direction, the shaft coupled to a single-piece extrusion comprising a rim and a plurality of radial protrusions, the rim having a longitudinal axis and a periphery with the plurality of radial protrusions extending outward from the periphery;
- providing a plurality of brushes, each brush having a base end supporting upstanding bristles, an opposing distal end, a leading side generally facing the forward direction, and an opposing trailing side; and
- securing the base ends of the plurality of brushes with a plurality of brush support members, each of the brush support members having a leading end and a trailing end with an upright flange, each of the plurality of brush support members securing a respective one of the base ends of the plurality of brushes against a respective one of the plurality of radial protrusions with the upright flange located adjacent the leading side.

17. The method of claim 16, further comprising providing a plurality of extrusion apertures positioned between the plurality of radial protrusions and a plurality of fasteners positioned through a brush support member aperture of the brush support member and the extrusion aperture to secure the brush support members to the extrusion.

18. The method of claim 17, wherein each of the fasteners is a bolt having threads that protrude away from the periphery preventing debris from accumulating on the fastener, the bolt further comprises a head, and each of the brush support members is sandwiched by one of the head and the periphery of the rim.

19. The method of claim 16, wherein the plurality of brush support members have an upper boundary projecting above the base end forwardly of the bristles, thereby protecting the bristles from damage when debris is encountered by the cotton doffer structure, the upright flange also acting to dislodge the debris from the surface.

20. The method of claim 16, wherein the radial protrusion is dovetail shaped and receives the base end that is opposingly dovetail shaped.

21. The method of claim 16, wherein the leading end of the plurality of brush support members is positioned against the radial protrusion adjacent the radial protrusion contacted by the brush.

22. The method of claim 16, wherein the shaft is a first stub shaft coupled to the extrusion and a second stub shaft is coupled to the extrusion.

* * * * *